Sept. 13, 1960 J. S. HAWLEY 2,952,836
FUNCTION CONTROL SYSTEM AND APPARATUS
Filed Oct. 31, 1956 6 Sheets-Sheet 1
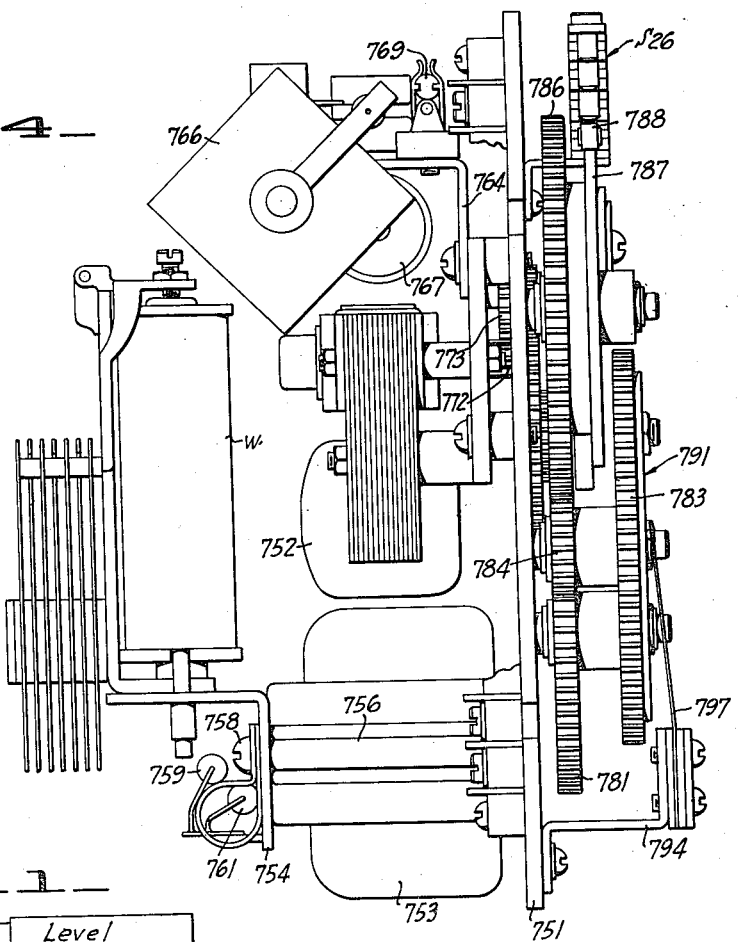
FIG_4_
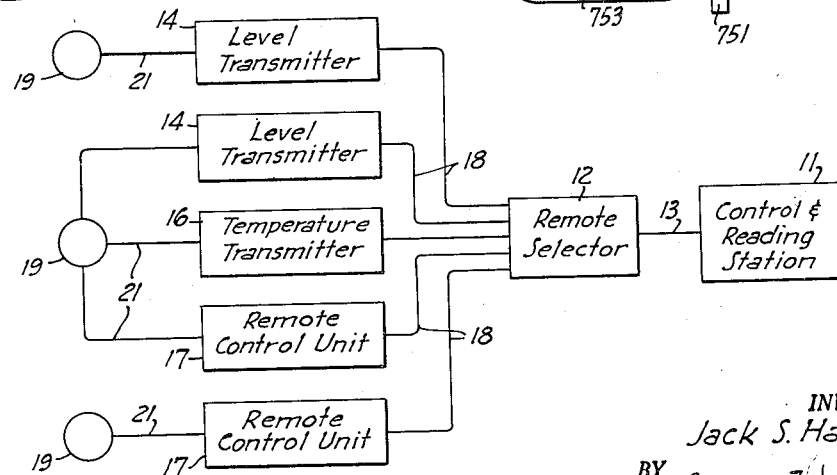
FIG_1_
INVENTOR.
Jack S. Hawley
BY
ATTORNEYS

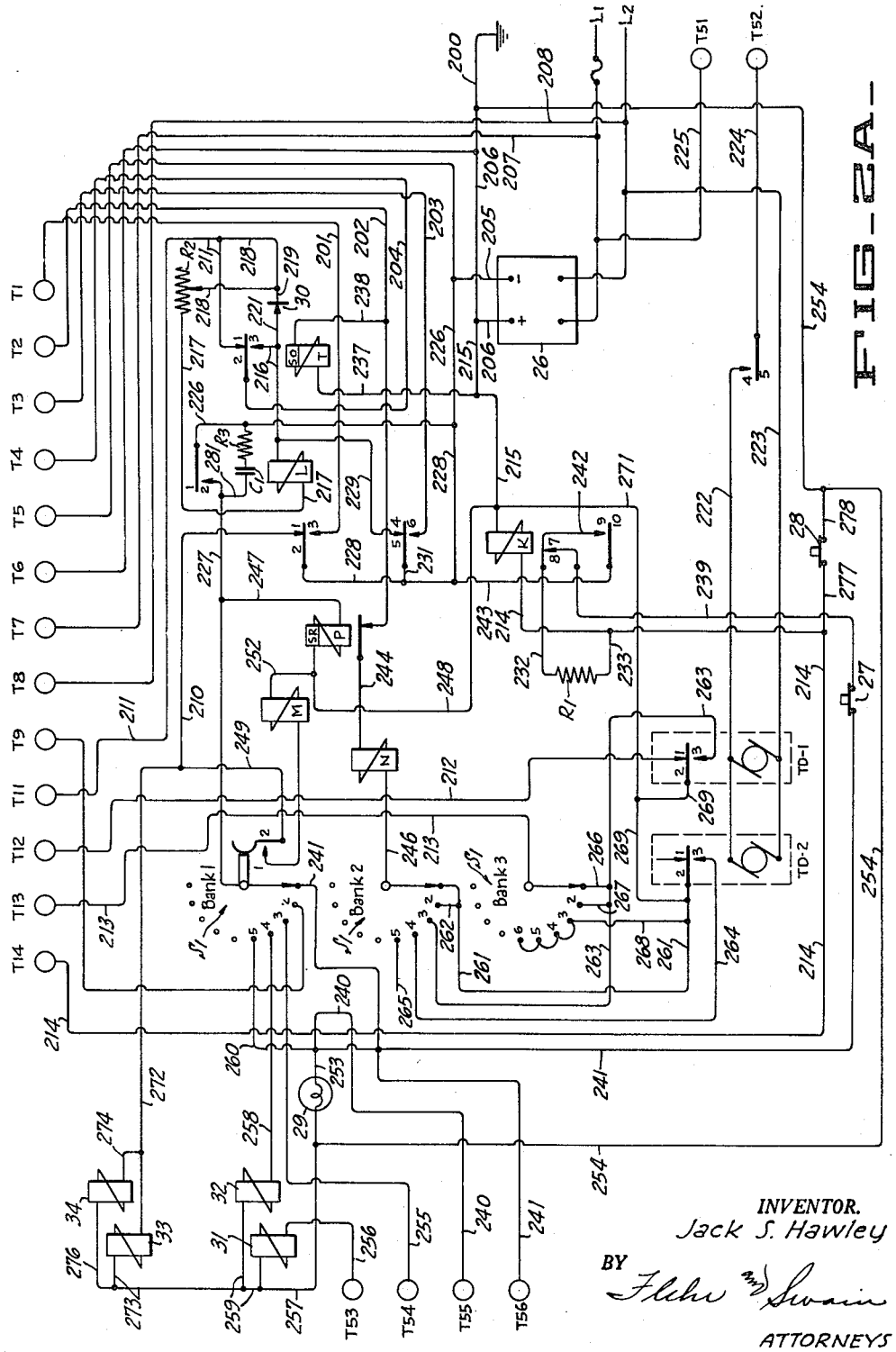

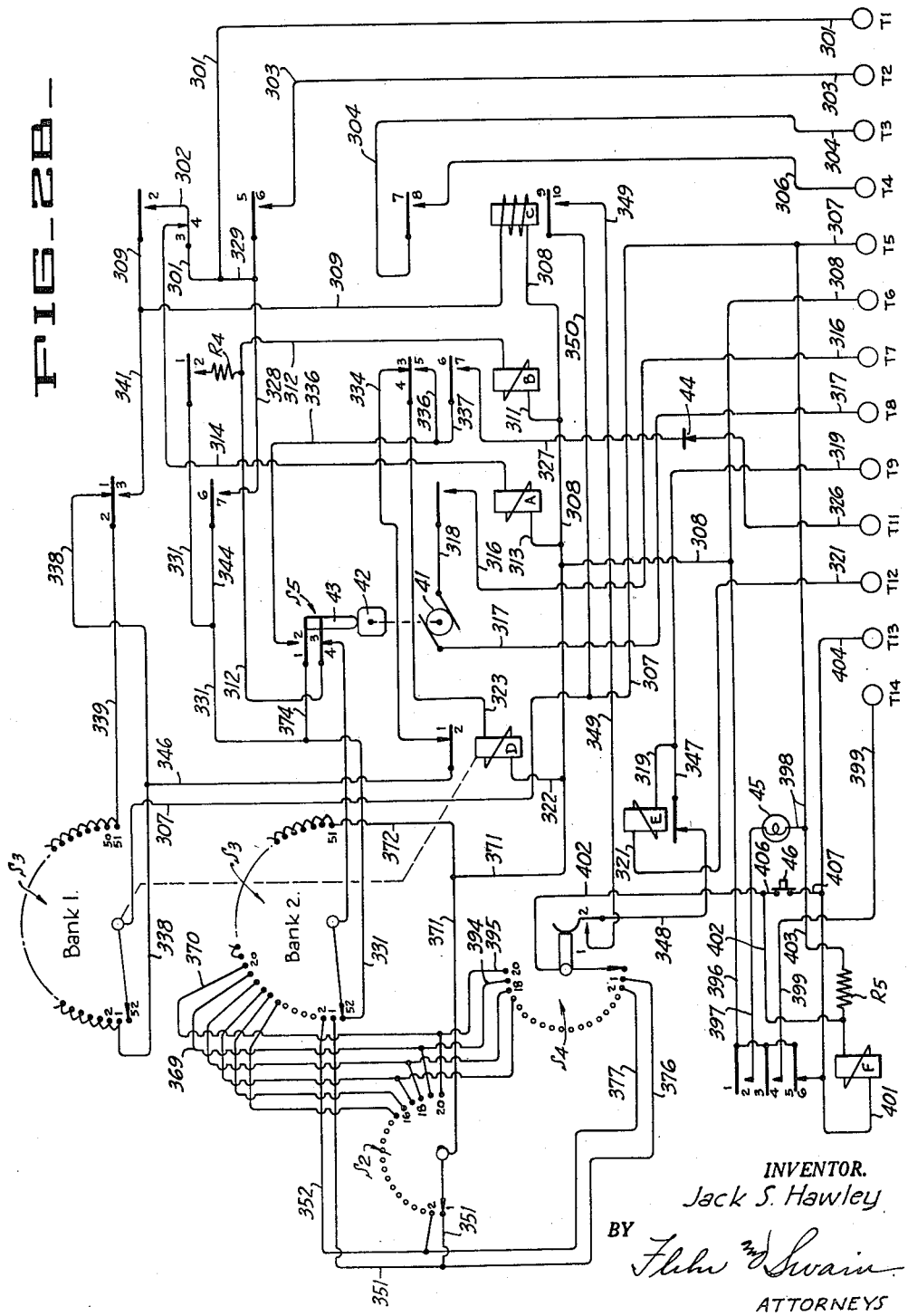

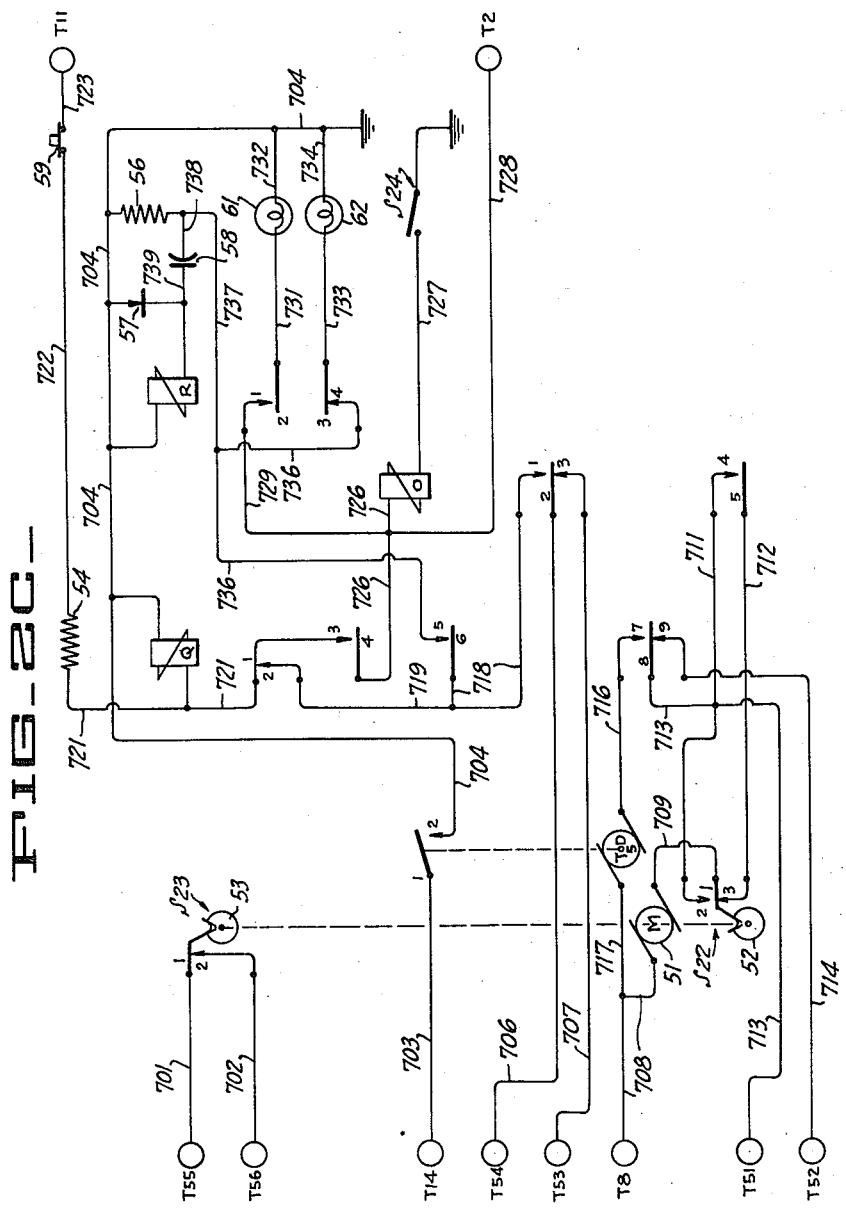

Sept. 13, 1960  J. S. HAWLEY  2,952,836
FUNCTION CONTROL SYSTEM AND APPARATUS
Filed Oct. 31, 1956  6 Sheets-Sheet 5
FIG_3_
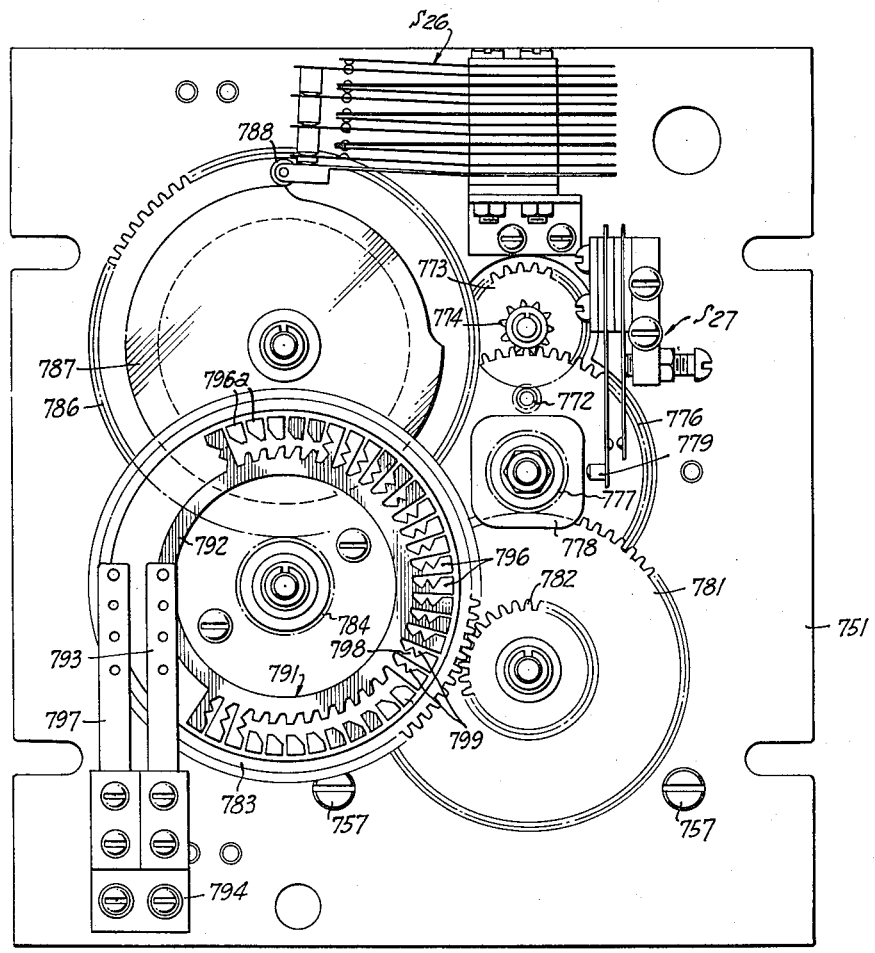
FIG_5_
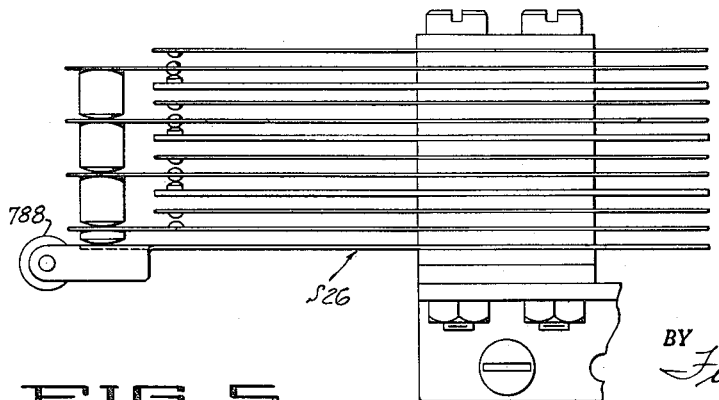
INVENTOR.
Jack S. Hawley
BY
ATTORNEYS

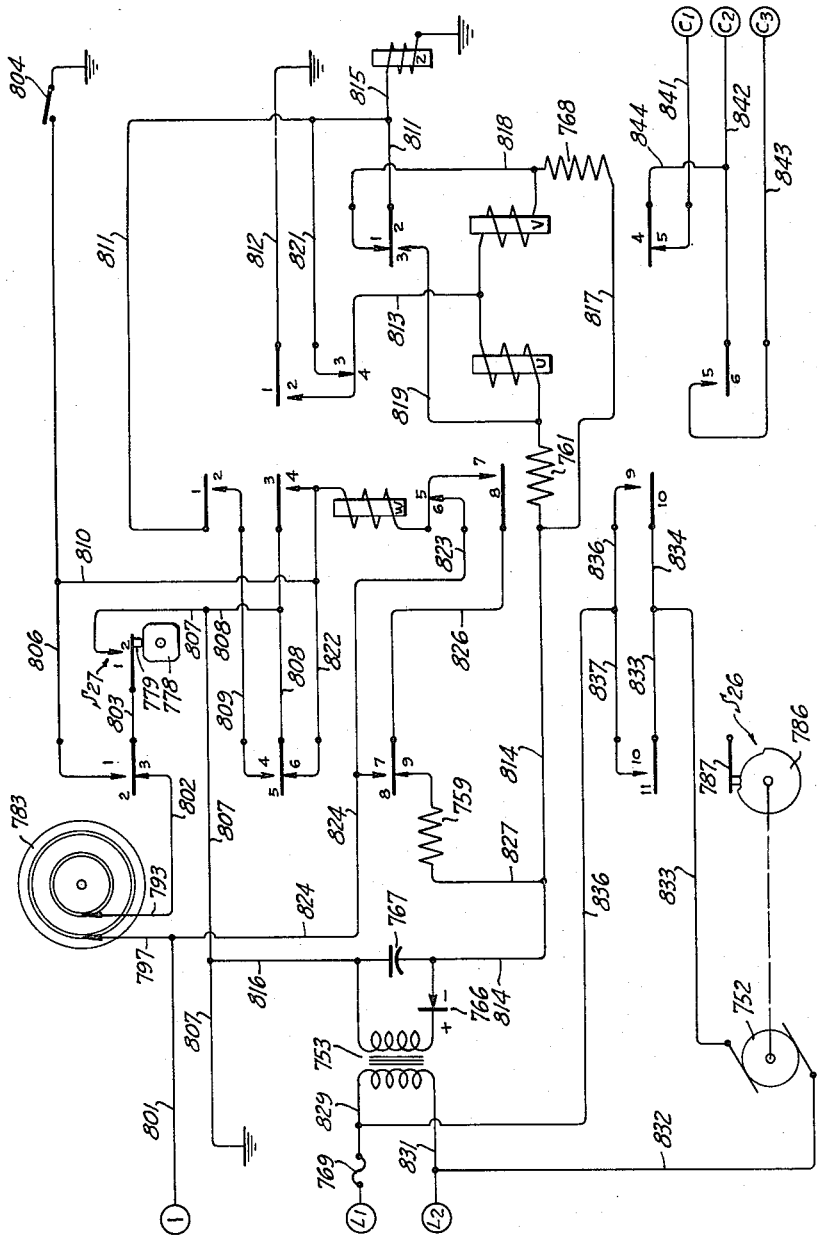

United States Patent Office 2,952,836
Patented Sept. 13, 1960

2,952,836

FUNCTION CONTROL SYSTEM AND APPARATUS

Jack S. Hawley, Berkeley, Calif., assignor to Shand and Jurs Co., Berkeley, Calif., a corporation of California Filed Oct. 31, 1956, Ser. No. 619,606

12 Claims. (Cl. 340—163)

This invention relates generally to a function control system and apparatus and more particularly to a function control system and apparatus for use in telemetering systems.

It is often desirable to provide means whereby the present position or condition of one or more remotely located functions or equipments can be determined. It is also often desirable to provide additional means whereby if desired the present condition of the function apparatus or equipment can be changed to another condition and that confirming means indicates the changed condition. When apparatus of this type is provided, it is particularly desirable that it be compatible with certain telemetering equipment which is presently in use. One type of such equipment is disclosed in my co-pending applications Serial No. 506,560, filed May 6, 1955, now Patent 2,919,435, Dec. 29, 1959 entitled "Selecting, Routing and Receiving System and Apparatus" and Serial No. 506,513, filed May 6, 1955, now Patent 2,877,444, Mar. 10, 1959, entitled "Remote Selecting System and Apparatus."

In general, it is an object of the present invention to provide a function control system and apparatus of the type which is compatible with telemetering systems of the type described in the above co-pending applications.

Another object of the invention is to provide a system and apparatus of the above character in which the remote unit transmits confirming code pulses to identify itself.

Another object of the invention is to provide a system and apparatus of the above character in which a signal is transmitted by the remote unit to indicate the condition of the equipment or function to which the remote unit is connected.

Anoher object of the invention is to provide a system and apparatus of the above character in which the condition of the equipment or function may be changed by the remote unit.

Another object of the invention is to provide a system and apparatus of the above character which will indicate the changed condition.

A further object of the invention is to provide a system and apparatus of the above character in which a particularly novel confirming code disc is provided in the remote unit.

Additional objects and advantages of the invention will appear from the following description in which the preferred embodiment has been set forth in conjunction with the accompanying drawings.

Referring to the drawings:

Figure 1 is a block diagram of a system and apparatus incorporating the present invention.

Figures 2A, 2B and 2C are a circuit diagram of the control station with provision for sending a single series of selecting code pulses and for receiving a single series of confirming code pulses.

Figure 3 is a front elevational view of the remote control unit.

Figure 4 is a side elevational view of the control unit shown in Figure 3.

Figure 5 is an enlarged detail view of the timing switch.

Figure 6 is a circuit diagram of the remote control unit with certain parts schematically illustrated.

The system and apparatus illustrated in the block diagram of Figure 1 shows a typical installation and consists of a control and reading station 11 which is connected to a remote selector 12 by electrical circuit means 13. The remote selector 12 can be of the type disclosed in my co-pending application Serial No. 506,513, filed May 6, 1955. The remote selector 12 may be connected to any combination of suitable devices. For example, it can be connected to level transmitters 14 which may be of the type disclosed in co-pending application Serial No. 342,402, filed March 16, 1953, now Patent 2,814,798, Nov. 26, 1957, a temperature transmitter 16 of the type disclosed in copending application Serial No. 677,077, filed August 8, 1957, or to remote control units 17 of the type disclosed herein. The devices 14, 16 and 17 are connected to the remote selector by electrical circuit means 18 and are connected to apparatus (not shown) associated with the tanks 19 by electrical circuit means 21. The level and temperature transmitters 14 and 16 and the remote units 17 can be utilized from various locations from which it is desired to transmit information to the reading station and for the control of certain functions from the control station, as for example, level control and fluid flow in dams, oil tanks, gas storage tanks, pipe lines and the like.

In general, the control and reading station 11 includes selecting means, the actuation of which causes the transmission of one or more series of selecting pulses, the number of pulses being determined by the control unit to be selected and means for sending a start pulse to actuate the control unit at the remote location. For example, in the apparatus shown in the block diagram in Figure 1, only one series of selecting pulses are generated and these are sent to the remote selector 12 to cause it to select the desired level transmitter 14, temperature transmitter 16 or remote control unit 17.

After the proper device has been selected, the control and reading station 11 transmits a start pulse which serves to actuate the device selected by the remote selector 12. If a level transmitter is selected, a sequence of operation takes place which is described in detail in co-pending applications Serial No. 342,402, filed March 16, 1953, and Serial No. 506,560, filed May 6, 1955. If a temperature transmitter is selected, a sequence of operation takes places which is described in detail in co-pending application Serial No. 677,066, filed August 8, 1957. If a remote control unit 17 is selected, a series of confirming code pulses is generated to confirm proper selection. If an improper number of confirming code pulses are received, an alarm is actuated at the control station which serves to indicate that an improper selection has been made. If the proper number of confirming code pulses are received, circuitry is provided at the remote control unit which will send a continuous series of pulses when the device connected to the remote control unit is in one condition or state and which will send a steady current or voltage when the same device is in another condition or state. If it is desired to change the condition or state of the device, a button at the control station is pressed to operate a pair of relays at the remote unit to change the condition. Both relays of the pair are energized or de-energized upon operation of the control button and are maintained in the new position even though the control station is disconnected from the remote unit. Visual means is provided at the control station to indicate the condition or state of the device connected to the remote control unit when the remote control unit is connected to the control station.

After a certain interval of time, means is actuated at the remote control unit to reset the remote unit. The remote selector 12 resets itself a short time thereafter and an indicating means is actuated at the control station to indicate that the system is ready for another cycle of telemetering or control.

The portion of the circuit diagram of the control station 11 shown in Figures 2A and 2B is very similar to that shown in Figures 3 and 4 of my co-pending application Serial No. 506,560, filed May 6, 1955. As described in that co-pending application, the circuit diagram of Figure 2A consists of a plurality of relays K, L, P and T, a three bank stepping switch S1 having a reset coil M and a step coil N, and two time delay devices TB-1 and TD-2. The three bank stepping switch S1 is of the direct driven "minor" switch type which resets immediately upon energization of the step coil.

A power supply 26 of suitable voltage such as 48 volts is connected to lines L1 and L2 which are connected to a suitable source of voltage such as 110 volts 60 cycle A.C. The apparatus also includes a start button 27, a reset button 28, a ready lamp 29 and a rectifier 30. Indicator step coils 31 and 32 and indicator reset coils 33 and 34 are parts of conventional indicating devices and are shown to facilitate explanation of the operation of the apparatus.

Terminals T1 to T14 are provided which are connected to the corresponding terminals in Figure 2B. Additional terminals T51 to T56 are provided which are connected to the corresponding terminals in Figure 2C. In Figure 2A, terminal T1 is connected to stationary contact 3 of relay K by conductor 201. Terminal T2 is connected to stationary contact of relay P by conductor 202 and terminal T3 is connected to stationary contact 6 of relay K by conductor 203. Terminal T4 is connected to movable contact 2 of relay T by conductor 204 and terminal T5 is connected to the negative terminal of the D.C. power supply 26 by conductor 205. Terminal T6 is connected to the positive terminal of the D.C. power supply by conductor 206 and is also connected to ground by conductor 200. Terminal T7 is connected to line L1 by conductor 207 and terminal T8 is connected to line L2 by conductor 208. Terminal T9 is connected to terminal 2 of bank 1 of switch S1 by conductor 209 and terminal T11 is connected to stationary contact 1 of relay T by conductor 211. Terminal T12 is connected to stationary contact 1 of time delay device TD-2 by conductor 212. Terminal T13 is connected to the wiping contact of bank 3 of switch S1 by conductor 213. Terminal T14 is connected to one side of the winding of relay K by conductor 214 and the other side of the winding of relay K is connected to conductor 206 by conductor 215.

Stationary contact 3 of relay T is connected to one side of the winding of relay L by conductor 216 and the other side of the winding of relay L is connected to one end of resistance R2 by conductor 217. Resistance R2 is provided with an adjustable tap which is connected to conductor 211 by conductor 218. Conductor 218 is connected to one side of rectifier 30 by conductor 219 and the other side of the rectifier 30 is connected to conductor 216 by conductor 221.

Stationary contact 4 of relay T is connected to one side of the motors of the time delay devices TD-1 and TD-2 by conductor 222 and the other side of the motors are connected to line L2 by conductor 223. Movable contact 5 of relay T is connected to terminal T52 by conductor 224 and terminal T51 is connected to line L1 by conductor 225.

Movable contact 1 of relay L is connected to conductor 205 by conductor 226 and stationary contact 2 of relay L is connected to the wiping contact of bank 1 of switch S1 by conductor 227.

Movable contact 2 of relay K is connected to conductor 226 by conductor 228 and stationary contact 4 of relay K is connected to conductor 216 by conductor 229. Movable contact 5 of relay K is connected to conductor 228 by conductor 231. Movable contact 7 of relay K is connected to one side of the resistance R1 by conductor 232 and the other side of the resistance R1 is connected to conductor 214 by conductor 233. One side of the winding of relay T is connected to conductor 215 by conductor 237 and the other side of the winding of relay T is connected to conductor 202 by conductor 238.

Stationary contact 8 of relay K is connected to one side of the start button 27 by conductor 239 and the other side of the start button 27 is connected to terminal 1 of bank 1 of switch S1 by conductor 241. Stationary contact 9 of relay K is connected to conductor 232 by conductor 242 and movable contact 10 of relay K is connected to conductor 228 by conductor 243.

The movable contact of relay P is connected to one side of step coil N by conductor 244 and the other side of step coil N is connected to the wiping contact of bank 2 of switch S1 by conductor 246. One side of the winding of relay P is connected to conductor 227 by conductor 247 and the other side of the winding of relay P is connected to conductor 215 by conductor 248. Off-normal contact 2 is connected to conductor 210 by conductor 249. Off-normal contact 1 of switch S1 is connected to one side of the reset coil M by conductor 251 and the other side of the reset coil M is connected to conductor 248 by conductor 252.

One side of the lamp 29 is connected to conductor 241 by conductor 253 and the other side of the lamp 29 is connected to conductor 200 and ground by conductor 254. Terminal 3 of bank 1 is connected to terminal T54 by conductor 255 and terminal T53 is connected to one side of indicator reset coil 31 by conductor 256. The other side of the reset coil is connected to conductor 254 by conductor 257. Terminal 4 of bank 1 is connected to the indicator step coil 32 by conductor 258 and the other side of the step coil 32 is connected to conductor 257 by conductor 259. Terminal 5 of bank 1 is connected to conductor 241 by conductor 260. The remainder of the terminals of bank 1 are not used in this embodiment of my invention.

Terminal 1 of bank 2 is connected to movable contact 2 of the time delay device TD-2 by conductor 261. Terminal 2 of bank 2 is connected to conductor 261 by conductor 262 and terminal 3 of bank 2 is connected to stationary contact 3 of TD-1 by conductor 263. Terminal 4 of bank 2 is connected to stationary contact 3 of TD-2 by conductor 264. Terminal 5 of bank 2 is connected to conductor 264 by conductor 265.

Terminal 1 of bank 3 is connected to conductor 263 by conductor 266 and terminal 2 of bank 3 is connected to conductor 263 by conductor 267. Terminals 3, 4, 5 and 6 of bank 3 are interconnected and are connected to conductor 261 by conductor 268.

Movable contact 2 of TD-1 is connected to conductor 261 by conductor 269 and conductor 269 is connected to conductor 215 by conductor 271.

One side of indicator reset coil 33 is connected to conductor 210 by conductor 272 and the other side of reset coil 33 is connected to conductor 259 by conductor 273. One side of indicator reset coil 34 is connected to conductor 272 by conductor 274 and the other side of the reset coil 34 is connected to conductor 273 by conductor 276.

The reset button 28 has one side connected to conductor 214 by conductor 277 and the other side to conductor 254 by conductor 278.

One side of condenser C1 is connected to conductor 227 by conductor 281 and the other side of condenser C1 is connected to one end of resistor R3 which has its other end connected to conductor 226. Condenser C1 and resistor R3 perform a spark arresting function to protect the contact of relay L.

As shown schematically in Figure 2B, the apparatus shown in the circuit diagram consists of a plurality of relays A, B, C and F and switches S2, S3 with step coil D, S4 with step coil E, and an impulse switch S5. Also included in the apparatus are resistors R4 and R5, a motor 41, and a cam 42 operated by the motor 41. The cam 42 serves to operate the impulse switch S5 by means of an insulating block 43 which frictionally engages the cam 42. A rectifier 44, a warning lamp 45 and a reset button 46 are also include within the apparatus.

As shown in Figure 2B, terminal T1 is connected to contact 4 of relay C by conductor 301. Stationary contact 2 of relay C is connected to movable contact 4 of relay C by conductor 302. Terminal T2 is connected to stationary contact 6 of relay C by conductor 303 and terminal T3 is connected to movable contact 7 of relay C by conductor 304. Terminal T4 is connected to stationary contact 8 of relay C by conductor 306.

Terminal T5 is connected to the wiping contact of bank 1 of switch S3 by conductor 307. Terminal T6 is connected to one side of the winding of relay C by conductor 308 and the other side of the winding of relay C is connected to movable contact 1 of relay C by conductor 309. One side of the winding of relay B is connected to conductor 308 by conductor 311 and the other side of the winding of relay B is connected to contact 3 of the pulsing contacts by conductor 312. One side of the winding of relay A is also connected to conductor 308 by conductor 313 and the other side of the winding of relay A is connected to the stationary contact 3 of relay C by conductor 314.

Terminal T7 is connected to stationary contact 9 of relay A by conductor 316 and terminal T8 is connected to one side of the motor 41 by conductor 317 and the other side of the motor 41 is connected to movable contact 8 of relay A by conductor 318. Terminal T9 is connected to one side of the step coil E by conductor 319 and the other side of the step coil E is connected to terminal T12 by conductor 321. Step coil D has one side connected to conductor 308 by conductor 322 and has the other side connected to movable contact 4 of relay B by conductor 323.

Terminal T10 is not used in this embodiment of the invention. Terminal T11 is connected to one side of the rectifier 44 by conductor 326 and the other side of the rectifier 44 is connected to stationary contact 7 of relay B by conductor 327. Terminal T11 is also connected to remote selecting apparatus of the type described in co-pending application Serial No. 506,513, filed on May 6, 1955, by any suitable means such as by wire or radio.

Movable contact 5 of relay C is connected to the stationary contact 7 of relay A by conductor 328. Conductor 328 is connected to conductor 301 by conductor 329.

Movable contact 1 of relay B is connected to terminal 52 of bank 2 of switch S3 by conductor 331 and stationary contact 2 of relay B is connected to resistor R4 and the other side of the resistor R4 is connected to conductor 312. Stationary contact 3 of relay B is connected to stationary contact 1 of step coil D by conductor 334 and stationary contact 5 of relay B is connected to stationary contact 1 of the pulsing contacts S5 by conductor 336. Movable contact 6 of relay B is connected to conductor 336 by conductor 337.

Stationary contact 1 of relay A is connected to terminals 1 through 50 of bank 1 of switch S3 by conductor 338, the terminals being interconnected. Movable contact 2 of relay A is connected to terminal 51 of bank 1 of switch S3 by conductor 339. Stationary contact 3 of relay A is connected to conductor 309 by conductor 341 and movable contact 6 of relay A is connected to conductor 331 by conductor 344.

Movable contact 2 of step coil D is connected to conductor 338 by conductor 346. Movable contact 1 of the step coil E is connected to conductor 319 by conductor 347 and the stationary contact 2 of step coil E is connected to off-normal contact 2 of switch S4 by conductor 348. Off-normal contact 1 of switch S4 is connected to movable contact 10 of relay C by conductor 349 and stationary contact 9 of relay C is connected to conductor 307 by conductor 350.

Terminals 1 to 20 of switch S2 are connected to terminals 1 to 20 of bank 2 of switch S3 by conductors 351 through 370. The wiping contact of switch S2 is connected to conductor 322 by conductor 371.

Terminals 21 through 51 of bank 2 of switch S3 are interconnected and are connected to conductor 371 by conductor 372. The wiping contact of bank 2 of switch S3 is connected to stationary contact 4 of pulsing contacts S5 by conductor 373. Movable contact 2 of pulsing contacts S5 is connected to conductor 331 by conductor 374.

Terminals 1 to 20 of switch S4 are connected to the corresponding terminals of switch S2 by connecting conductors 376 through 395 to conductors 351 through 370.

Movable contacts 1, 3 and 5 of relay F are interconnected and are connected to conductor 308 by conductor 396 and stationary contact 2 of relay F is connected to warning lamp 45 by conductor 397 and the other side of lamp 45 is connected to conductor 307 by conductor 398. Stationary contact 4 of relay F is connected to terminal T14 by conductor 399. Stationary contact 6 of relay F is connected to one side of the winding of relay F by conductor 401 and the other side of the winding of relay F is connected to the wiping contact of switch S4 by conductor 402. Resistor R5 has one end connected to conductor 402 and has the other end connected to conductor 398 by conductor 403. Terminal 13 is connected to stationary contact 6 of relay F by conductor 404.

One side of reset button 46 is connected to conductor 402 by conductor 406 and the other side of reset button 46 is connected to conductor 404 by conductor 407.

As shown schematically in the portion of the circuit diagram shown in Figure 2C, the apparatus includes relays Q, R and O and a time delay device TD-5. It also includes a motor 51 which operates cams 52 and 53. Cam 52 is adapted to operate a switch S22 and cam 53 is adapted to operate a switch S23. The apparatus also includes resistances 54 and 56, a rectifier 57, a condenser 58, a control button 59 and indicating lamps 61 and 62.

As shown in Figure 2C, terminal T55 is connected to movable contact 1 of switch S23 by conductor 701 and stationary contact 2 of switch S23 is connected to terminal T56 by conductor 702. Terminal T14 is connected to movable contact 1 of the time delay device TD-5 by conductor 703 and stationary contact 2 of time delay device TD-5 is connected to ground by conductor 704. Terminal T54 is connected to movable contact 2 of relay O by conductor 706 and terminal T53 is connected to stationary contact 3 by conductor 707. Terminal T8 is connected to one side of the motor 51 by conductor 708 and the other side of the motor 51 is connected to movable contact 2 of switch S22 by conductor 709. Stationary contact 1 of switch S22 is connected to stationary contact 4 of relay O by conductor 711 and stationary contact 3 of switch S22 is connected to movable contact 5 of relay O by conductor 712.

Terminal T51 is connected to movable contact 8 of relay Q by conductor 713 and terminal T52 is connected to stationary contact 9 of relay Q by conductor 714. Stationary contact 7 of relay Q is connected to one side of the motor for time delay device TD-5 by conductor 716 and the other side of the motor for time delay device TD-5 is connected to conductor 708 by conductor 717. Stationary contact 1 of relay O is connected to movable contact 6 of relay Q by conductor 718. Conductor 718 is connected to stationary contact 2 of relay Q by conductor 719. Stationary contact 1 of relay Q is connected to one side of resistor 54 by conductor 721 and the other side of resistor 54 is connected to one side of the control button 59 by conductor 722. The other side of the control button 59 is connected to terminal T11 by conductor 723. The winding for relay Q is connected between conductors 704 and 721. Stationary contact 3 of relay Q is connected to contact 1 of relay Q. Movable contact 4 of relay Q is connected to one side of winding of relay O by conductor 726 and the other side of the winding of relay O is connected to terminal T57 by conductor 727. Terminal T2 is connected to conductor 726 by conductor 728. Conductor 726 is connected to stationary contact 1 of relay R by conductor 729. Movable contact 2 of relay R is connected to one side of lamp 61 by conductor 731 and the other side of the lamp 61 is connected to conductor 704 by conductor 732. Movable contact 3 of relay R is connected to one side of red lamp 62 by conductor 733 and the other side of lamp 62 is connected to conductor 704 by conductor 734. Stationary contact 4 of relay R is connected to stationary contact 5 of relay Q by conductor 736 and conductor 736 is connected to one side of a resistance 56 by conductor 737. The other side of resistance 56 is connected to conductor 704. Conductor 737 is connected to one side of a condenser 58 by conductor 738 and the other side of the condenser 58 is connected to conductor 739. The other side of the winding of relay R is connected to conductor 704. A rectifier 57 is connected between conductor 704 and conductor 739. This completes the description of the control and reading station 11. Operation thereof will be described after the remote control unit 17 has been described.

The remote control unit 17 shown in Figures 3, 4 and 5 consists of a mounting plate 751 which carries a motor 752 centrally located thereon. A transformer 753 is mounted on the plate 751. A mounting bracket 754 is supported above the transformer 753 by a pair of mounting posts 756. One end of each of the mounting posts 756 is fastened to the mounting plate 751 by suitable means such as screws 757 and the other end of each of the posts is fixed to the mounting plate 751 by suitable means such as screws 758. The mounting bracket 754 carries three relays, relays U, V and W, relay W being the only relay shown in Figure 4.

The relays are of a conventional type such as those manufactured by Automatic Electric Company. A pair of resistors 759 and 760 are also mounted on the bracket 754 for a purpose hereinafter described. Another bracket 764 is mounted on the plate 751 and serves as a mounting for a rectifier 766, a condenser 767, a resistor 768 (not shown) and a fuse 769.

The output shaft of the motor 752 is fixed to a gear 772 which meshes with a gear 773. A gear 774 is fixed to a gear 773 and drives a gear 776. A gear 777 and a pulsing cam 778 are fixed to gear 776 and rotate therewith. A cam 778 is adapted to engage an insulating block 779 which operates the impulse contacts S27 which are fixed to the mounting plate 751. From the shape of the cam 778, it is apparent that the impulse contacts will be closed four times for each revolution of the cam 778.

Gear 777 drives a gear 781. A gear 782 is fixed to gear 781 and drives a code disc 783 which will be described hereinafter. A gear 784 is fixed to the code disc 783 and drives a gear 786. A timing cam 787 is fixed to the gear 786 and rotates therewith. The periphery of the cam 787 is adapted to be engaged by a cam follower 788 which is adapted to operate the timing switch S26.

The code disc 783 is formed from suitable material such as "Micarta." A commutator-like circuit 791 is printed on the disc 783 in a conventional manner. The commutator circuit 791 consists of an inner conducting ring portion 792 which is adapted to be engaged by a sliding contact 793 mounted on a bracket 794 fixed to the mounting plate 751. A plurality of leg-like portions 796 extend outwardly at substantially right angles from the inner ring portion 792, the outer extremities 796a of which are adapted to be engaged by sliding contact 797 fixed to the bracket 794. The outer extremities 796a are adapted to be electrically separated from the inner ring portion 792 by tearing out triangular-shaped portions 798 formed between notches 799. Thus, as shown, certain of the outer extremities have been severed from the inner ring portion 792 by removing the triangular-shaped portions 798. This may be accomplished in any suitable manner such as with a knife. By removing the triangular-shaped portions 798 from a number of the leg-like portions 796 it is possible to set up a prearranged code as hereinafter described.

The circuitry for the remote control unit is shown in Figure 6. As shown in Figure 6, the circuit diagram consists of an incoming line 801 which is adapted to be connected to the remote selector 12 or other selecting device. Line 801 is connected to wiping contact 797. Wiping contact 793 is connected to stationary contact 3 of timing switch S26 by conductor 802. Movable contact 2 of switch S26 is connected to movable contact 2 of the impulse contacts S27 by conductor 803. Stationary contact 1 of switch S26 is adapted to be connected to ground through a switch 804 by conductor 806.

Stationary contact 1 of impulse contacts S27 is connected to ground by conductor 807 and conductor 807 is connected to movable contact 5 of S26 by conductor 808. Stationary contact 4 of switch S26 is connected to stationary contact 2 of relay W by conductor 809. Movable contact 1 of relay W is connected to movable contact 2 of relay V by conductor 811, and conductor 811 is connected to one side of the coil for relay Z by conductor 815. The other side of the coil for relay Z is connected to ground. Movable contact 1 of relay U is connected to ground by conductor 812 and stationary contact 2 of relay U is connected to contact 4 which is connected to one side of each of the windings of relays U and V by conductor 813. The other side of the winding for relay U is connected to one side of a resistor 761 and the other side of resistor 761 is connected to one side of the rectifier 766 by conductor 814. The other side of the rectifier 766 is connected to the secondary of the transformer 753 and the other side of the secondary of the transformer 753 is connected to conductor 807 by conductor 816. The condenser 767 is connected between conductors 814 and 816 and serves as a filter capacitor.

The other side of the winding for relay V is connected to one side of a resistor 768 and the other side of the resistor 768 is connected to the conductor 814 by conductor 817. Resistor 768 is also connected to stationary contact 1 of relay V by conductor 818. Stationary contact 3 of relay V is connected between the resistor 761 and one side of the winding of relay U by conductor 819. Stationary contact 3 of relay U is connected to conductor 811 by conductor 821.

Stationary contact 4 of relay W is connected to stationary contact 6 of switch S6 by conductor 822. One side of the winding of relay W is connected to conductor 822 and the other side of the winding is connected to contact 5 of relay W and contact 5 of relay W is connected to stationary contact 7 of relay W. Stationary contact 6 of relay W is connected to stationary contact 7 of switch S26 by conductor 823 and conductor 823 is connected to conductor 801 by conductor 824. Movable contact 8 of relay W is connected to movable contact 8 of switch S26 by conductor 826. Stationary contact 9 of switch S26 is connected to one side of resistor 759 and the other side of resistor 759 is connected to conductor 814 by conductor 827.

Terminals L1 and L2 are provided which are adapted to be connected to a conventional source of power such as 110 volt 60 cycle A.C. Line L1 is conected to one side of a fuse 769 and the other side of the fuse 769 is connected to the primary of the transformer 763 by a conductor 829. Terminal L2 is connected to the other side of the primary winding of transformer 763 by conductor 831. Conductor 831 is connected to one side of the motor 752 by conductor 832 and the other side of the motor 752 is connected to movable contact 11 of switch S26 by conductor 833. Conductor 833 is connected to movable contact 10 of relay W by conductor 834. Stationary contact 9 of relay W is connected to conductor 829 by conductor 836 and conductor 836 is connected to stationary contact of switch S26 by conductor 837.

Relays Z, U and V may be provided with any number of sets of control contacts for accomplishing control functions as hereinafter described. For example, as shown in Figure 6, relays U and V are each provided with an additional set of contacts which are connected to control terminals C1, C2 and C3. Control terminal C1 is connected to stationary contact 5 of relay U by conductor 841. Terminal C2 is connected to movable contact 6 of relay U by conductor 842 and terminal C3 is connected to movable contact 5 of relay U by conductor 843. Movable contact 4 of relay V is connected to conductor 842 by conductor 844.

The operation of my function control system and apparatus may now be described as follows: Let it be assumed that the terminal T11 of the control and reading station 11 is connected to a remote selector 12 and that the remote selector 12 is connected to one or more remote control units 17. For example, let it be assumed that the first terminal of the remote selector 12 is connected to a remote control unit 17. This being the case, it is necessary that the wiping contact of switch S2 be moved to its number 1 terminal.

It should be pointed out that when the remote selector 12 is on a home position, it serves to maintain a ground continuously on the line connecting it to terminal 11 as described in my co-pending applicaion Serial No. 506,513, filed May 6, 1955. Thus, when the apparatus shown in Figures 2A, 2B and 2C is in the home or resting position, relay L will be continuously energized and the ready light 29 will be lit continuously. This circuit is completed from the negative terminal of a D.C. power supply 26 through conductor 205, conductor 226, conductor 228, conductor 231, contacts 4 and 5 of relay K, conductor 229, the winding of relay L, conductor 217, resistor R2, the adjustable tap of resistor R2, conductor 218, terminal T11 to the ground maintained at the remote selector 12.

Operation of the L relay energizes the ready lamp 29. This circuit is completed from the negative terminal of a D.C. power supply through conductor 205, conductor 226, contacts 1 and 2 of relay L, conductor 227, to the wiping contact of bank 1 of switch S1, terminal 1 of switch S1, conductor 241, terminal T56, conductor 702, contacts 1 and 2 of switch S23, conductor 701, terminal T55, conductor 240, conductor 253, lamp 29, conductor 254, conductor 200 to ground.

When the ready light is glowing, start button 27 may be depressed which causes energization of relay K. This circuit is completed from a negative terminal of a D.C. power supply 26, through conductor 205, conductor 226, contacts 1 and 2 of relay L, conductor 227, the wiping contact of bank 1 of switch S1, terminal 1 of bank 1 of switch S1, conductor 241, terminal T56, conductor 702, contacts 1 and 2 of switch S23, conductor 701, terminal T55, conductor 240, start button 27, conductor 239, contacts 7 and 8 of relay K, conductor 232, resistance R1, conductor 233, conductor 214, the winding of relay K, conductor 215, conductor 206 to the positive terminal of the D.C. power supply 26.

The energization of relay K closes its contacts 9 and 10 to establish a holding circuit for relay K. This circuit is completed from the negative terminal of the D.C. power supply 26, through conductor 205, conductor 226, conductor 228, conductor 243, contacts 9 and 10 of relay K, conductor 242, conductor 232, resistance R1, conductor 233, conductor 214, the winding of relay K, conductor 215, conductor 206 to the positive terminal of the power supply.

The closing of contacts 5 and 6 of relay K by energization of relay K places a negative voltage on terminal T3. This circuit can be traced from the negative terminal of the D.C. power supply 26, through conductor 205, conductor 226, conductor 228, conductor 231, contacts 5 and 6 of relay K, conductor 203 to terminal T3.

Closing of contacts 2 and 3 of relay K by energization of relay K places the negative D.C. voltage on terminal T1. This circuit can be traced from conductor 228, through contacts 2 and 3 of relay K, conductor 201 to terminal T1.

The placing of a negative D.C. voltage on terminal T1 causes operation of relay A. This circuit is completed from the negative voltage on terminal T1, through conductor 301, contacts 3 and 4 of relay C, conductor 314, the winding of relay A, conductor 313, conductor 308, terminal T6, conductor 206 to ground.

The energization of relay A closes its contacts 8 and 9 to energize motor 41 which is connected to terminals T7 and T8 which in turn are connected to the 110 volt 60 cycle alternating current. The motor 41 serves to rotate the cam 42 to cause periodic opening and closing of the pulsing contacts of S5.

The closing of contacts 6 and 7 of relay A places a negative voltage on contact 4 of the pulsing contacts S5 so that when contacts 3 and 4 of S5 are closed, relay B is energized. This circuit is completed from the negative voltage on terminal T1 through conductor 301, conductor 329, conductor 328, contacts 6 and 7 of relay A, conductor 344, conductor 331, terminal 52 of bank 2 of switch S3, the wiping contact of bank 2 of switch S3, conductor 373 to stationary contact 4 of the pulsing contacts S5 and then when the cam 42 next allows the contacts 3 and 4 to close, the circuit is continued through contact 3 of the pulsing contacts S5, conductor 312, the winding of relay B, conductor 311, conductor 308, terminal T6, conductor 206 to ground.

The energization of relay B closes its contacts 1 and 2 which establish a holding circuit for relay B. This circuit is completed from the negative voltage on terminal T1, through conductor 301, conductor 329, conductor 328, contacts 6 and 7 of relay A, conductor 344, conductor 331, contacts 1 and 2 of relay B, resistance R4, conductor 312, the winding of relay B, conductor 311, conductor 308, terminal T6 to ground.

Contacts 6 and 7 of relay B are closed by energization of relay B and serve to send pulses over terminal T11 to the remote selector 12. The circuit is completed from a negative voltage on terminal T1 through conductor 301, conductor 329, conductor 328, contacts 6 and 7 of relay A, conductor 344, conductor 331, conductor 374, contacts 1 and 2 of pulsing contacts S5, conductor 336, conductor 337, contacts 6 and 7 of relay B, conductor 327, rectifier 44, conductor 326, terminal T11 to ground at the remote selector 12. Thus it is apparent that as the cam 42 rotates and the contacts 1 and 2 of pulsing contacts S5 are periodically closed, that a series of pulses will be sent to the remote selector 12. It is also apparent that only complete pulses will be sent out to the remote selector 12 because relay B can only be initially energized when contacts 3 and 4 of pulsing contacts S5 are closed and when contacts 1 and 2 of pulsing contacts S5 are open.

At the same time relay B is energized, its contacts 4 and 5 are closed to energize the step coil D. Switch S3 is back acting so that each release or de-energization of the step coil D advances the wiping contact of switch S3 one step. This circuit is completed from the negative voltage on terminal T1 through conductor 301, conductor 329, conductor 328, contacts 6 and 7 of relay A, conductor 344, conductor 331, conductor 374, contacts 1 and 2 of impulse switch S5, conductor 336, contacts 4 and 5 of relay B, conductor 323, coil D, conductor 322, conductor 308, terminal T6 to ground. Thus, switch S3 is advanced one step for every pulse sent out through terminal T11 to the remote selector 12 until the wiping contact of bank 2 of switch S3 finds the ground which is established by switch S2 on one of the terminals of bank 2 of switch S3. In this instance, switch S2 is on terminal 1 and relay B will be de-energized after the termination of the first pulse sent out through terminal T11 because the wiping contact of bank 2 of switch S3 establishes a parallel circuit and shunts relay B. The shunt circuit may be traced from the winding of relay B through conductor 312, contacts 3 and 4 of impulse switch S5, conductor 373, wiping contact of bank 2 of switch S3, terminal 1 of bank 2 of switch S3, conductor 351, terminal 1 of switch S2, wiping contact of switch S2, conductor 371, conductor 322, conductor 308, conductor 311, to coil of relay B. This provides a shunt path directly across the coil of relay B causing it to drop out. Resistance R4 in the path of the energizing circuit of relay B prevents a direct short on the power supply.

Since terminal 1 of switch S2 was selected, only one pulse will be sent out over terminal T11. However, it is apparent that if, for instance, terminal 18 had been selected by switch S2, that switch S3 would be advanced until the wiping contact of bank 2 engaged terminal 18 of bank 2 to find a ground to de-energize relay B. In this instance, eighteen pulses would be sent out to terminal T11 before relay B would be de-energized.

As soon as relay B is de-energized, contacts 3 and 4 of relay B are closed causing switch S3 to step rapidly to terminal 51. This circuit is completed from the negative terminal of the D.C. power supply 26, through conductor 205, terminal T5, conductor 307, the wiping contact of bank 1 of switch S3, terminal 1 of bank 1 of switch S3, conductor 338, conductor 346, normally closed contacts 1 and 2 of step coil D, conductor 334, contacts 3 and 4 of relay B, conductor 323, step coil D, conductor 322, conductor 308, terminal T6 to ground. Thus, step coil D is energized. However, as soon as the step coil D is energized, contacts 1 and 2 of step coil D are opened causing de-energization of step coil D which causes the wiping contacts of switch S3 to advance to the next position which in this case would be terminal 2. De-energization of step coil D releases its contacts 1 and 2 which again close the circuit to energize step coil D. Thus, step coil D is periodically energized until the wiping contact of bank 1 of switch S3 reaches terminal 51 and moves the negative voltage from the circuit to coil D. Terminals 1 to 50 of bank 1 of switch S3 are normally connected to stationary contact 1 of relay A and since relay A is normally energized during this stepping operation, contacts 1 and 2 of relay A will not be closed.

However, if a power failure should have occurred between the operation of the start button 27 and the aforementioned stepping operation, contacts 1 and 2 of relay A will be closed and stepping will continue until the wiping contacts reach the home position at terminals 52.

Since contacts 2 and 3 of relay A are normally closed when the wiping contact of bank 1 of switch S3 arrives at terminal 51 of bank 1, the negative voltage will be applied to contacts 2 and 3 of relay A to energize relay C. This circuit is completed from contacts 2 and 3 of relay A through conductor 341, conductor 309, the coil of relay C, conductor 308, terminal T6 to ground.

Operation of relay C closes its contacts 1 and 2 establishing a holding circuit for relay C. This circuit is completed from the negative voltage on terminal T1 through conductor 301, conductor 302, contacts 1 and 2 of relay C, conductor 309, the winding of relay C, conductor 308, terminal T6 to ground. The opening of normally closed contacts 3 and 4 of relay C by energization of relay C de-energizes relay A which in turn causes step switch S3 to be advanced to terminal 52. The circuit for energizing the step coil D to cause this last step is completed from the negative voltage on terminal T5, through conductor 307, the wiping contact of bank 1 of switch S3, terminal 51 of bank 1, conductor 339, contacts 1 and 2 of relay A, conductor 338, conductor 346, contacts 1 and 2 of step coil D, conductor 334, contacts 3 and 4 of relay B, conductor 323, step coil D, conductor 322, conductor 308, terminal T6 to ground.

Closing of contacts 5 and 6 of relay C by energization of relay C causes energization of relay T to control the transmission of a start pulse to terminal T11 to the remote selector 12. Closing of contacts 5 and 6 also causes energization of step coil N. The circuit for energizing step coil N is completed from the negative terminal of the D.C. power supply 26, through conductor 205, conductor 226, conductor 228, contacts 2 and 3 of relay K, conductor 201, terminal T1, conductor 301, conductor 329, contacts 5 and 6 of relay C, conductor 303, terminal T2, conductor 202, contacts 1 and 2 of relay P, conductor 244, step coil N, conductor 246, the wiping contact of bank 2 of switch S1, terminal 1 of bank 2 of switch S1, conductor 261, conductor 269, conductor 271, conductor 215, conductor 206 to the positive terminal of the D.C. power supply 26. The circuit for energizing relay T is identical through conductor 202 after which the circuit goes through conductor 238, the winding of relay T, conductor 237, conductor 215, conductor 206 to ground.

Closing of contacts 5 and 6 of relay C also causes energization of relay O. The circuit is completed from the negative terminal of the D.C. power supply 26 through conductor 205, conductor 226, conductor 228, contacts 2 and 3 of relay K, conductor 201, terminal T1, conductor 301, conductor 329, contacts 5 and 6 of relay C, conductor 303, terminal T2, conductor 728, conductor 726, the winding of relay O, conductor 727 through switch S24 to ground.

Opening of contacts 2 and 3 and closing of contacts 1 and 2 of relay O removes the foot channel 255 from the foot indicator coil 31 and places the output on relay coil G. Closing of contacts 4 and 5 of relay O causes energization of the motor 51 which may be operated at any suitable speed such as two revolutions per minute. The circuit for energizing the motor 51 is completed from line L1, conductor 225, terminal T51, conductor 713, conductor 711, contacts 4 and 5 of relay O, conductor 712, contacts 2 and 3 of switch S22, motor 51, conductor 703, terminal T8 to line L2.

As soon as the motor 51 starts in operation, cam 52 causes opening of the contacts 2 and 3 and closing of contacts 1 and 2 of switch S22 but a circuit for the motor 51 is maintained by contacts 1 and 2 of switch S22.

Cam 53 is also operated by motor 51 and causes opening of contacts 1 and 2 of switch S23 and serves to remove battery from the ready lamp 29 and the start button 27 to render them inoperative during the remainder of the cycle.

A start pulse is then sent from the control and reading station 11 through the remote selector 12 to the selected function control 17. The circuit for sending the start pulse over terminal T11 is completed from the negative terminal of the D.C. power supply 26, through conductor 205, conductor 226, conductor 228, conductor 231, contacts 5 and 6 of relay K, conductor 203, terminal T3, conductor 304, contacts 7 and 8 of relay C, conductor 306, terminal T4, conductor 204, contacts 1 and 2 of relay T, conductor 211, terminal T11 to ground at the selected remote control unit 17. As pointed out previously, relay T is of the "slow to operate" type and the start pulse is terminated when contacts 1 and 2 of relay T are opened.

As hereinbefore described, at the same time that relay T is energized, step coil N is energized causing the wiping contacts of switch S1 to be advanced from terminals 1 to terminals 2. The apparatus is now in condition to receive confirming pulses from the selected remote control unit 17 to determine whether or not the remote selector 12 made the proper selection. The ground for the start pulse in the remote control unit 17, shown in Figure 3, is completed from line 801 to line 824, contacts 5 and 6 of relay W, the winding of relay W, conductor 822, contacts 5 and 6 of switch S26, conductor 808, conductor 807 to ground. Thus, the start pulse energizes relay W and causes closing of its contacts 9 and 10. Closing of contacts 9 and 10 causes energization of motor 752 as is readily apparent from the circuit diagram.

Closing of contacts 7 and 8 of relay W establishes a holding circuit for relay W. This circuit is completed from the negative side of the rectifier 776 to conductor 814, conductor 827, resistance 759, contacts 8 and 9 of switch S26, contacts 7 and 8 of relay W, the winding of relay W, conductor 822, contacts 5 and 6 of switch S26, conductor 808, conductor 807, conductor 816, through the secondary winding of transformer 753 to the positive side of the rectifier 766.

The confirming code pulses are generated by the remote control unit 17 through the code disc 783 which places periodic grounds on the line 801. The first ground placed on the terminal T11 by the remote control unit 17 causes operation of relay L. The circuit is completed from the negative terminal of the D.C. power supply 26 through conductor 205, conductor 226, conductor 228, conductor 231, contacts 5 and 6 of relay K, conductor 203, terminal T3, conductor 304, contacts 7 and 8 of relay C, conductor 306, terminal T4, conductor 204, contacts 2 and 3 of relay T, conductor 216, the winding of relay L, conductor 217, resistance R2, the adjustable tap of resistance R2, conductor 218, terminal T11, through the remote selector 12, line 801, wiping contact 797, through one of the leg portions 796 and the ring portions 792 to the starting contact 793, conductor 802, contacts 2 and 3 of switch S26, conductor 803, contacts 1 and 2 of switch S27, conductor 807 to ground.

Thus, as the code disc 783 is rotated by the motor 752, the line 801 will be grounded each time the wiping contact 797 engages one of the leg portions 796. The length of time that the line 801 is grounded is determined by the time that contacts 1 and 2 of the impulse contacts S27 are closed. Wiping contact 797 engages any one of the leg portions 796 for a period of time longer than the period of time for which contacts 1 and 2 of switch S27 remain closed.

The number of pulses sent by the coding disc 783 is determined by the number of leg portions 796 that are engaged before the wiper 797 engages one of the outer extremities 796a which has been separated from the inner circular portion 792 by removal of the triangular portion 798. As soon as one of these is encountered, an open circuit appears and relay L is not operated. Thus, for example, if it is desired to send only one confirming code pulse, the first leg portion is left intact and the triangular portions should be removed from several of the subsequent leg portions 796 to prevent the transmission of more than one pulse. Additional series of pulses may be transmitted by leaving subsequent leg portions intact after a suitable interval has elapsed between the first series of code pulses. Thus, as shown in Figure 3, a second series of code pulses would be commenced when the wiping contact 797 engages the sixth leg portion. However, it should be pointed out that in the present embodiment only one series of confirming code pulses is required.

As previously explained, the rectifier 30 in parallel with the resistance R2 cooperates with the resistance R2 to produce a delay in the drop out time of relay L and provides means for making adjustments to correct for distortion caused by lines 13 and 18 connecting terminal T11 to the remote control unit 17.

Operation of relay L by one of the confirming code pulses causes a pulse to be sent through terminal 2 of bank 1 of switch S1 to terminal T9 to cause energization of the step coil E to advance switch S4 from terminal 0 to terminal 1. This circuit is completed from the negative terminal of the D.C. power supply, through conductor 205, conductor 226, contacts 1 and 2 of relay L, conductor 227, the wiping contact of bank 1 of switch S1, terminal 2 of bank 1 of switch S1, conductor 209, terminal T9, conductor 309, step coil E, conductor 321, terminal T12, conductor 212, contacts 1 and 2 of time delay device TD–1, conductor 269, conductor 271, conductor 215, conductor 206, to the positive terminal of the power supply 26.

Closing of contacts 1 and 2 of relay L also causes energization of relay P causing it to open its contacts 1 and 2. This circuit is completed from the negative terminal of the D.C. power supply 26, through conductor 205, conductor 226, contacts 1 and 2 of relay L, conductor 227, conductor 247, the winding of relay P, conductor 248, conductor 215, conductor 206, to the positive terminal of the D.C. power supply.

As soon as one of the grounds on line 801 has been terminated by the code disc 783, relay L will be de-energized. When the next ground is placed on line 801 by the code disc 783, relay L is again energized causing another pulse to be sent to terminal T9 to energize the step coil E to advance the switch S4 another step. Thus, it is apparent that relay L follows the pulses and that switch S4 will be advanced one step for each pulse.

In the present instance, it has been assumed that the remote control unit 17 was selected by position 1 of switch S2 and hence the code disc 783 will be set up so that only one confirming code pulse will be generated. As explained previously, this is accomplished by leaving the first leg portion 796 intact and then removing the triangular shaped portion 798 from all the subsequent leg portions 796.

If this is the case, only one confirming code pulse will be received by switch S4 and hence it would be advanced to terminal 1 only. Engagement of the wiping contact of switch S4 with the terminal 1 will place a ground on one side of the winding of relay F. This can be traced from the winding of relay F through conductor 402, wiping contact of switch S4, terminal 1 of switch S4, conductor 376, conductor 351, terminal 1 of switch S2, wiping contact of switch S2, conductor 371, conductor 322, conductor 308, terminal T6 to ground.

Relay F is provided to confirm proper transmitter selection. As hereinafter described, if the selection is proper, relay F will not be operated and the apparatus will complete its sequence of operations. However, if the selection is not properly confirmed, relay F will be operated, and the apparatus will be reset automatically and warning lamp 45 will be lit to show faulty operation.

After completion of the transmission of confirming code pulses, the motor 752 continues rotation of the cam 786 and causes operation of the timing switch S26. Operation of switch S26 opens contacts 8 and 9 which de-energizes the holding circuit for relay W. Closing of contacts 10 and 11 of switch S26 maintains the holding circuit for the motor 752 even though contacts 9 and 10 of relay W are opened when relay W is de-energized.

Opening of contacts 2 and 3 of switch S26 removes the code disc 783 from the circuit connected to the line 801. Relay W is now adapted to be energized by closing of contacts 1 and 2 of switch S27. This circuit is completed from line 801, conductor 824, contacts 5 and 6 of relay W, the winding of relay W, conductor 822, conductor 810, conductor 806, contacts 1 and 2 of switch S26, conductor 803, contacts 1 and 2 of switch S27, conductor 807 to ground.

Closing of contacts 7 and 8 of switch S27 provides a parallel circuit for energizing relay W and prevents chattering of relay W.

Now let it be assumed that the operation of switch 804 is controlled by the device or apparatus which may be termed a variable that is connected to the remote control unit 17 and that the switch 804 is in an open position when the apparatus or variable is in one position or state and closed when the apparatus is in another position or state.

If the switch 804 is closed, a steady pulse or continuous voltage will be sent out over the line 801. The circuit is completed from line 801 through conductor 824, conductor 823, contacts 5 and 6 of relay W, the winding of relay W, conductor 822, conductor 810, conductor 806 through switch 804 to ground. Thus, when switch 804 is closed, continuous ground is applied to the line 801. Relay W is not energized by this current because it is too weak.

If switch 804 is open, a series of pulses are applied to the line 801 by switch S27. This circuit is completed from line 801 to conductor 824, conductor 823, contacts 5 and 6 of relay W, the winding of relay W, conductor 822, conductor 810, conductor 806, contacts 1 and 2 of switch S26, conductor 803, contacts 1 and 2 of switch S27, conductor 807 to ground. Thus, the line 801 will be periodically grounded by the switch S27. Again, relay W is not energized because the current is too weak.

Relay P is of the slow release type, the release time being such that it remains operated between code pulses and hence does not follow the code pulses which have been sent in to terminal T11. However, as soon as the confirming code pulses have been transmitted, which in this instance would be after one code pulse, a predetermined interval lapses before additional information is sent by the remote control unit 17. During this interval, relay P releases and closes its contacts 1 and 2 to cause energization of step coil N through a circuit previously described, except in this instance the circuit is completed through terminal 2 and conductor 262 of bank 2 rather than through terminal 1 of bank 2. Energization of step coil N causes step switch S1 to be advanced from terminal 2 to terminal 3, after which the apparatus is in condition for the receipt of additional information from the remote control unit 17.

Advancement of step switch S1 to terminal 3 places a ground on one side of the winding of relay F and if the other side has not been grounded by the wiping contact of switch S4, then relay F will be operated to light lamp 45 to indicate faulty operation as described in my copending application Serial No. 506,560, filed May 6, 1955. As also described in that application, if the operation of the apparatus has been proper relay F will not be operated because it will normally be shunted by switch S4.

Assuming that the wiping contact of switch S4 has been advanced to the proper terminal so that relay F will not be operated, or if misoperation has occurred, that the apparatus has been operated until the proper operation has occurred, the following sequence of operation takes place thereafter.

After transmission of confirming code pulses, the remote control unit 17 will periodically establish a ground on line 801 as hereinbefore described and if the switch 804 is open will send a plurality of pulses to the control station 11 to terminal T11 to cause periodic operation of relay L which causes a plurality of pulses to be sent over terminal 3 of switch S1 to cause operation of relay Q. This circuit is completed from the negative terminal of the D.C. power supply to conductor 205, conductor 226, contacts 1 and 2 of relay L, conductor 227, wiping contact of bank 1 of switch S1, terminal 3 of bank 1 of switch S1, conductor 255, terminal T54, conductor 706, contacts 1 and 2 of relay O which is operated to close contacts 1 and 2 as hereinbefore described, conductor 718, conductor 719, contacts 1 and 2 of relay Q, conductor 721, the winding of relay Q, conductor 704 to ground.

The receipt of the first pulse by relay Q causes operation of relay Q and closing of its contacts 3 and 4 and opening of its contacts 1 and 2. The relay is of the type such that contacts 3 and 4 of relay Q are closed before contacts 1 and 2 are opened.

Closing of contacts 3 and 4 establishes a holding circuit for relay Q. This circuit is completed from the negative terminal of the D.C. power supply 26 through conductor 205, conductor 226, conductor 228, contacts 2 and 3 of relay K, conductor 201, terminal T1, conductor 301, conductor 329, contacts 5 and 6 of relay C, conductor 303, terminal T2, conductor 728, conductor 726, contacts 3 and 4 of relay Q, conductor 721, the winding of relay Q, conductor 704 to ground.

Closing of contacts 7 and 8 of relay Q energizes time delay device TD-5. This circuit is completed from line L1 through conductor 225, terminal T51, conductor 713, contacts 7 and 8 of relay Q, conductor 716, time delay device TD-5, conductor 717, conductor 708, terminal T8, conductor 208 to line L2.

Opening of contacts 8 and 9 of relay Q prevents energization of time delay devices TD-1 and TD-2 and prevents stepping of switch S1 from terminal 3.

Closing of contacts 5 and 6 of relay Q applies the pulses being received over terminal T54 to the condenser 58. Each time a pulse is received, a charge is applied to the condenser 58. The current for charging the capacitor comes through the rectifier 57 and, therefore, the relay R is not energized. After the pulse has been terminated and the condenser 58 charged, the condenser discharges through relay R to ground to cause energization of relay R. Rectifier 57 prevents the back E.M.F. from the collapse of the field in relay R from discharging and therefore, makes relay R slow to release to prevent chatter and to keep it energized until the next pulse is received.

Operation of relay R causes lamp 61 to be lit. This is accomplished by closing of contacts 1 and 2 of relay R which permits the negative voltage on terminal T2 to pass through the lamp 61 to ground.

If a steady pulse or continuous voltage is being transmitted by the remote control unit 17 such as when the switch 804 is closed, substantially the same operation takes place except that relay R is not operated because the steady pulse or continuous voltage cannot pass through the condenser 58. Resistance 56 is a current limiting resistance. Relay R is not operated and contacts 3 and 4 of relay R remain in a closed position to energize lamp 62. Thus, when a steady pulse or continuous voltage is being received from the remote unit 17, lamp 62 is lit and when an intermittent pulse is being received from the function control apparatus lamp 61 is lit.

Now let it be assumed that it is desired to change the condition or state of the apparatus or device connected to the remote control unit 17. The control button 59 is then closed which serves to energize relay W. This circuit is completed from the battery on terminal T2 through conductor 728, conductor 726, contacts 3 and 4 of relay Q, conductor 721, resistor 54, conductor 722, push button 59, conductor 723, terminal T11, conductor 801, conductor 824, conductor 823, contacts 5 and 6 of relay W, the winding of relay W, conductor 822, conductor 810, conductor 806 through switch 804 to ground if switch 804 is closed. If switch 804 is open, the circuit is completed from conductor 810 to conductor 806, contacts 1 and 2 of switch S26, conductor 803, contacts 1 and 2 of switch S27, conductor 807 to ground.

Now assuming that relays U and V are both deenergized, the operation is as follows: Operation of relay W causes energization of relay U. This circuit is completed from the negative terminal of rectifier 766 to conductor 814, resistor 761, the winding of relay U, conductor 813, contacts 3 and 4 of relay U, conductor 821, conductor 811, contacts 1 and 2 of relay W, conductor 809, contacts 4 and 5 of switch S26, conductor 808, conductor 807 to ground.

Relay V is not operated at this time because it is effectively shunted by a ground which is applied on each side of the coil. One side of the coil of relay V is grounded by conductor 813 as previously described. The other side is grounded by conductor 818 through contacts 1 and 2 of relay V, conductor 811, contacts 1 and 2 of relay W, conductor 809, contacts 4 and 5 of switch S26, conductor 808, conductor 807 to ground.

Contacts 1 and 2 of relay W maintain a ground on conductor 813 and thus relay U is maintained in an energized condition and relay V is maintained in a de-energized condition.

As soon as the control button 59 is released, relay W is de-energized which removes the ground on conductor 813 by opening of contacts 1 and 2 of relay W. As soon as this occurs, relay V is energized. The circuit is completed from the negative terminal of the rectifier 776, conductor 814, conductor 817, resistor 768, the winding of relay V, conductor 813, contacts 1 and 2 of relay U, conductor 812 to ground.

Contacts 5 and 6 of relay U and contacts 4 and 5 of relay V have been provided for control purposes. Any number of additional contacts may be provided if desired. Contacts 4 and 5 of relay V are normally closed whereas contacts 5 and 6 of relay U are normally open. It is apparent by the foregoing operation hereinbefore described that upon closing of push button 59, relays U and V are energized which will close contacts 5 and 6 of relay U and open contacts 4 and 5 of relay V. These contacts and additional contacts can be utilized for controlling numerous functions such as the operation of gates, valves, doors, motors and the like.

After the push button 59 is released, relays U and V will remain energized and thus serve to maintain contacts 5 and 6 of relay U and contacts 4 and 5 of relay V in their new positions.

If, after a time, it is desired to change the position of contacts 5 and 6 of relay U and contacts 4 and 5 of relay V, push button 59 is again operated which causes energization of relay W in a manner hereinbefore described. At this time, relays U and V are still energized. Upon operation of relay W however, relay U is de-energized in that its coil is shunted out by a circuit commencing with conductor 819, through contacts 2 and 3 of relay V, conductor 811, contacts 1 and 2 of relay W, conductor 809, contacts 4 and 5 of switch S26, conductor 808, conductor 807 to ground.

Relay V is not de-energized at this time because the ground on one side of its coil is still maintained by contacts 3 and 4 of relay U. When relay U is de-energized contacts 1 and 2 of relay U are opened removing ground from contact 2. At the same time contacts 3 and 4 of relay U are closed and a ground is still maintained on conductor 813 by contacts 1 and 2 of relay W.

Opening of the control button 59 de-energizes relay W and opens its contacts 1 and 2 to remove ground from relay V and cause its de-energization. Thus, upon the second operation of the push button 59, relays U and V are returned to a de-energized condition and contacts 5 and 6 of relay U and contacts 4 and 5 of relay V are returned to the position shown in Figure 6. The device or apparatus controlled through terminals C1, C2 and C3 are thus adapted to be controlled remotely by push button 59.

An additional feature is provided in the remote control unit 17 by the relay Z. Any number of contacts can be provided on relay Z for various control purposes. Relay Z is operated momentarily each time the push button 59 is depressed. It is readily apparent that such a feature can be used for many desirable control functions.

It will be noted from the foregoing description that relay U always operates before relay V even though both may be energized or both may be de-energized.

Resistors 761 and 768 have been provided to limit current flow during the time the coils of relays U and V have been shunted.

After a suitable control period such as 16 seconds, time delay device TD–5 operates to close its contacts 1 and 2 to apply ground to terminal T14 which causes de-energization of relay K. De-energization of relay K is caused by establishing a shunt circuit around relay K. The circuit is established from the coil of relay K to conductor 214, terminal T14, conductor 703, contacts 1 and 2 of time delay device TD–5, conductor 704, to ground. Resistance R1 prevents a direct short on the power supply 26.

The de-energization of relay K opens its contacts 2 and 3 and 5 and 6 to remove the negative potential of the D.C. power supply from terminals T1 and T3 to cause de-energization of relays T and C. The de-energization of relay T opens its contacts 4 and 5 to de-energize the time delay devices TD–1 and TD–2. Time delay devices TD–1 are provided with means whereby they are automatically reset when de-energized.

De-energization of relay T closes its contacts 9 and 10 which provides a circuit for energizing step coil E to advance switch S4 to its home position. This circuit is completed from the negative terminal of the D.C. power supply through conductor 205, terminal T5, conductor 307, conductor 350, contacts 9 and 10 of relay C, conductor 349, off-normal contacts 1 and 2 of switch S4, conductor 348, normally closed contacts 1 and 2 of step coil E, conductor 347, conductor 319, step coil E, conductor 321, terminal T12, conductor 212, contacts 1 and 2 of TD–1, conductor 269, conductor 271, conductor 215, conductor 206 to the positive terminal of the power supply 26. Switch S4 will continue to be stepped until the circuit is broken by the off-normal contacts of switch S4 when switch S4 reaches its home position.

De-energization of relay K closes the contacts 1 and 2 of relay K which energizes the reset coil N for switch S1.

The circuit for energizing reset coil N is completed from the negative terminal of the D.C. power supply 26 through conductor 205, conductor 226, conductor 228, contacts 1 and 2 of relay K, conductor 210, conductor 249, off-normal contacts 1 and 2, conductor 251, coil M, conductor 252, conductor 248, conductor 215, conductor 206 to the positive terminal of the D.C. power supply. Switch S1 is rapidly stepped to a home position until off-normal contacts 1 and 2 of switch S1 are opened.

De-energization of relay C opens its contacts 5 and 6 to remove battery from relay O to restore it to its initial condition as shown in Figure 2C.

At the end of a predetermined time interval, a time interval substantially greater than the time interval required for the time delay device TD–5 to close contacts 1 and 2, such as 30 seconds, the motor 51 completes one revolution of cams 52 and 53 to restore switches S22 and S23 to their normal position as shown in Figure 2C. Opening of contacts 1 and 2 of switch S22 de-energizes the motor 51. Closing of contacts 1 and 2 of switch S23 establishes the normal ready light circuit.

As disclosed in co-pending application Serial No. 506,-513, filed May 6, 1955, the remote selecting apparatus is also provided with means for automatically homing itself after a predetermined interval of time. In the home position, it again establishes a ground on terminal T11 which causes operation of relay L and energization of the lamp 29 to indicate that the apparatus is again in condition for another reading operation.

The circuit for energization of the ready light is completed from the negative terminal of battery 26 through conductor 205, conductor 226, contacts 1 and 2 of relay L, conductor 227, the wiping contact of bank 1 of switch S1, terminal 1 of bank 1 of switch S1, conductor 241, terminal T56, conductor 702, contacts 1 and 2 of switch S23, conductor 701, terminal T55, conductor 240, conductor 253, ready lamp 29, conductor 254, conductor 200 to ground.

Within a short time after the time delay device TD–5 has operated to close its contacts 1 and 2, motor 752 will have driven cam member 786 to a position to permit switch S26 to move to an open position. Moving of switch S26 to its open position causes opening of its contacts 10 and 11 to de-energize motor 752. Closing of contacts 2 and 3 places the code disc 783 back in the circuit connected to line 801. The remote control unit is now in position to receive another start pulse. It will be noted that the condition of relays U and V is not affected by the operation of switch S26.

The operation hereinbefore described has been in conjunction with function control. However, it is apparent that the apparatus at the control station can be used for receiving one or more series of indicating pulses as described in my co-pending application Serial No. 506,560, filed May 6, 1955.

It is also apparent from my co-pending application, Serial No. 506,560, filed May 6, 1955, that means may be provided for the transmission of one or more series of code pulses to be used for selection of remotely located apparatus and that one or more series of confirming code pulses can be transmitted by the remotely located function control which is shown in Figure 6. Thus, as described in that application, my apparatus may be used in conjunction with any combination of remotely located devices and local devices.

It is also apparent that the function control apparatus I have provided is compatible with equipment presently in use. There is no increase in the communication facility requirements since only a single electrical circuit must be provided.

I claim:

1. In an electrical control system adapted to control from a control station through a remote selector connected to a remote control unit the operation of a remotely located variable, said variable being capable of assuming two states, electrical circuit means connecting the control station to the remote selector and to the remote control unit, means at the control station for generating a series of selecting code pulses and to send the selecting code pulses to said remote control unit, means at the control station for sending a start pulse to the remote selector to initiate operation of the same, pulse generating means at the remote control unit, means at the remote control unit for connecting the pulse generating means to the electrical circuit means, means at the remote control unit for causing said pulse generating means to send a series of confirming code pulses to the control station, means at the control station for confirming that the number of confirming code pulses sent by the remote control unit are equal to the number of selecting code pulses sent by the control station, means at the remote control unit for applying a series of pulses or a continuous voltage to said electrical circuit means after transmission of said confirming code pulses, said last named means in one state of said variable serving to place a series of pulses on said electrical circuit means and in the other state of said variable serving to place a continuous voltage on said electrical circuit means, means at the control station for determining whether a continuous voltage or a series of pulses are being applied to said electrical circuit means by said remote control unit, and means at the remote control unit for changing the position of said variable from one state to the other, said last named means being operable from said control station.

2. A system as in claim 1 wherein said last named means includes a pair of sequentially operated relays, the relays having contacts for controlling the operation of said variable.

3. A system as in claim 1 wherein said means at the remote control unit for connecting the pulse generating means to the electrical circuit means and said means for causing said pulse generating means to send a series of confirming code pulses includes a code disc and a pair of contacts engaging said code disc, said code disc being provided with electrical conducting means, said conducting means comprising an annular ring-like portion mounted on said disc and leg-like portions mounted on said disc and electrically connected to the annular ring-like portion, one of said pair of contacts engaging said annular ring-like portion and the other of said pair of contacts being adapted to engage the extremities of said leg-like portions, certain of the extremities of said leg-like portions being electrically disconnected from the annular ring-like portion to permit setting up a prearranged code on said code disc.

4. In an electrical control system adapted to control from a control station through a remote control unit the operation of a remotely located variable, said variable being capable of assuming two states, the system comprising electrical circuit means connecting the control station to the remote control unit, means at the control station for sending a start pulse to the remote control unit to initiate operation of the same, means at the remote control unit for generating and applying a series of pulses to said electrical circuit means, means adapted to be operated by said variable to place a continuous voltage on said electrical circuit means when said variable is in one of said states, means at the control station for determining whether a continuous voltage or a series of pulses are being applied to said electrical circuit means by said remote control unit, and means at the remote control unit operable from the control station for changing the state of said variable from one state to the other state.

5. A system as in claim 4 wherein said last named means includes a pair of sequentially operated relays, the relays including contacts for controlling the operation of said variable.

6. A system as in claim 5 wherein said pair of relays are both operated in one state of said variable and both relays are not operated in the other state of said variable.

7. A system as in claim 6 together with means for returning said control unit to a home position after a predetermined interval of time.

8. A system as in claim 7 wherein the means for returning said control unit to a home position does not affect the condition of said pair of relays.

9. In an electrical control system adapted to control from a control station through a remote control unit the operation of a remotely located device, said device being capable of assuming two states, the system comprising electrical circuit means connecting the control station to the remote control unit, means at the control station for sending a start pulse to the remote control unit to initiate operation of the same, switch means adapted to be moved to open or closed positions by said device as it assumes said states, means for applying a continuous voltage to said electrical circuit means when said switch means is in one of said positions, and means for applying pulses to electrical circuit means when said switch means is in the other of said positions, means at the control station for determining whether a continuous voltage or a series of pulses are being applied to said electrical circuit means by said remote control unit, and means at the remote control unit operable from the control station for changing the state of said device from one state to the other state.

10. A system as in claim 9 wherein said last named means includes a pair of sequentially operated relays, both of said relays being operated in one state of said variable.

11. A system as in claim 9 wherein said last named means includes a first relay at the remote control unit operable from the control station, a second relay at the remote control unit, said first relay having contacts controlling the energization and de-energization of the second relay, said second relay being operated upon operation of said first relay, and a third relay at the remote control unit, said first relay having contacts controlling the energization and de-energization of the third relay, said third relay being operated upon return of said first relay to its initial condition, said second and third relays having a contact means for controlling the operation of said device.

12. A system as in claim 9 wherein said last named means includes a first relay at the remote control unit adapted to be energized and de-energized from the control station, a second relay, said first relay having contacts controlling the energization and de-energization of the second relay, said second relay being energized upon energization of said first relay, and a third relay at the remote control unit, said first relay having contacts controlling the energization and de-energization of the third relay, said third relay being energized upon de-energization of said first relay, said second and third relays having contact means for controlling the operation of said device.

References Cited in the file of this patent

UNITED STATES PATENTS

| | | |
|---|---|---|
| 1,783,900 | Bird | Dec. 2, 1930 |
| 1,814,524 | Nelson | July 14, 1931 |
| 1,895,718 | Kleinschmidt | Jan. 31, 1933 |
| 1,945,665 | Stewart | Feb. 6, 1934 |
| 2,352,543 | Holtzmann | June 27, 1944 |
| 2,561,930 | Klay | July 24, 1951 |
| 2,616,959 | Breese et al. | Nov. 4, 1952 |